(12) United States Patent
Ewehag et al.

(10) Patent No.: US 12,134,338 B2
(45) Date of Patent: Nov. 5, 2024

(54) VEHICLE SEAT ADJUSTABLE BETWEEN A FORWARD FACING SETUP AND A REARWARD FACING SETUP

(71) Applicant: Ningbo Geely Automobile Research & Development Co., Ltd., Ningbo (CN)

(72) Inventors: Oskar Ewehag, Gothenburg (SE); Johan Höcks, Varberg (SE); Christian Forsberg, Laholm (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 375 days.

(21) Appl. No.: 17/555,400

(22) Filed: Dec. 18, 2021

(65) Prior Publication Data

US 2022/0111768 A1  Apr. 14, 2022

Related U.S. Application Data

(63) Continuation of application No. PCT/CN2020/101310, filed on Jul. 10, 2020.

(30) Foreign Application Priority Data

Aug. 13, 2019  (EP) .................................... 19191574

(51) Int. Cl.
 *B60N 2/20* (2006.01)
 *B60N 2/18* (2006.01)
 *B60N 2/30* (2006.01)

(52) U.S. Cl.
 CPC .......... *B60N 2/203* (2013.01); *B60N 2/1817* (2013.01); *B60N 2/3011* (2013.01)

(58) Field of Classification Search
 CPC ..... B60N 2/203; B60N 2/1817; B60N 2/3011
 See application file for complete search history.

(56) References Cited

U.S. PATENT DOCUMENTS

| 80,041 A | 7/1868 | White |
| 645,609 A | 3/1900 | Schellenbach |

(Continued)

FOREIGN PATENT DOCUMENTS

| CN | 101309813 A | 11/2008 |
| CN | 101716034 B | 8/2011 |
| CN | 203485793 U | 3/2014 |

(Continued)

OTHER PUBLICATIONS

International Search Report from corresponding International Application No. PCT/CN2020/101310, mailed on Oct. 10, 2020, 3 pages.

*Primary Examiner* — Mark R Wendell
(74) *Attorney, Agent, or Firm* — Tucker Ellis LLP

(57) ABSTRACT

The invention relates to a vehicle seat arranged to be adjusted between a forward facing/rearward facing setup. The vehicle seat comprises a seat back and a seat cushion arrangement comprising a seat cushion arranged to be attached to a seat structure, a front pivoting notch and a rear pivoting notch. The seat back comprises a first and a second seat back connection arranged on a seat back side arranged to be releasably engaged with a first and second latch respectively. The second seat back connection is arranged to releasably engage with a first latch when the vehicle seat is in the forward facing setup, and the first seat back connection is arranged to releasably engage with a second latch the vehicle seat is in the rearward facing setup.

10 Claims, 8 Drawing Sheets

(56) References Cited

U.S. PATENT DOCUMENTS 5,322,341 A 6/1994 Harrison et al.
6,991,285 B1 1/2006 Hemenway

FOREIGN PATENT DOCUMENTS

| CN | 208411507 U | 1/2019 |
|---|---|---|
| CN | 209225001 U | 8/2019 |
| DE | 202010016482 U1 | 2/2011 |
| IN | 109532602 A | 3/2019 |
| JP | S61203140 U | 12/1986 |

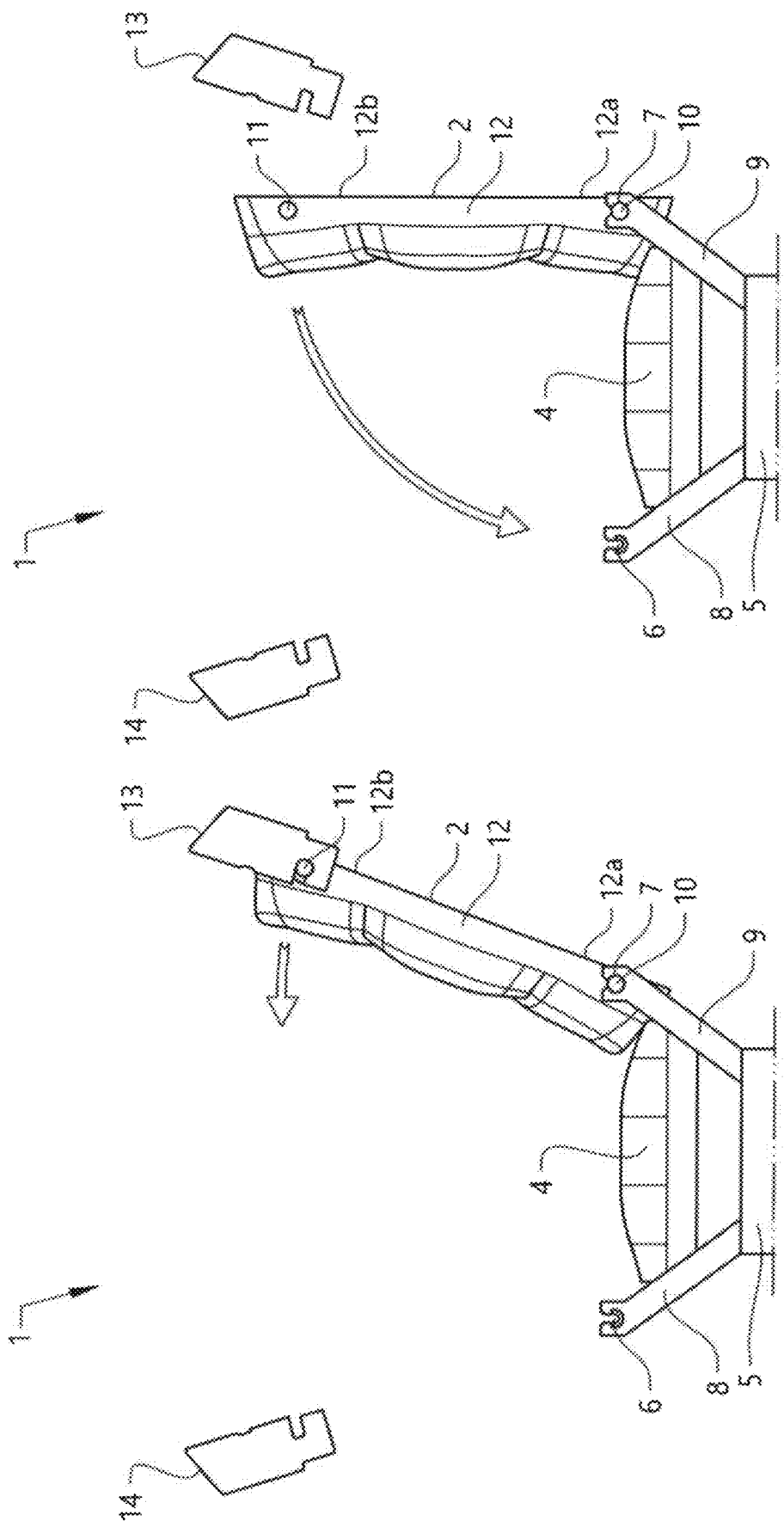

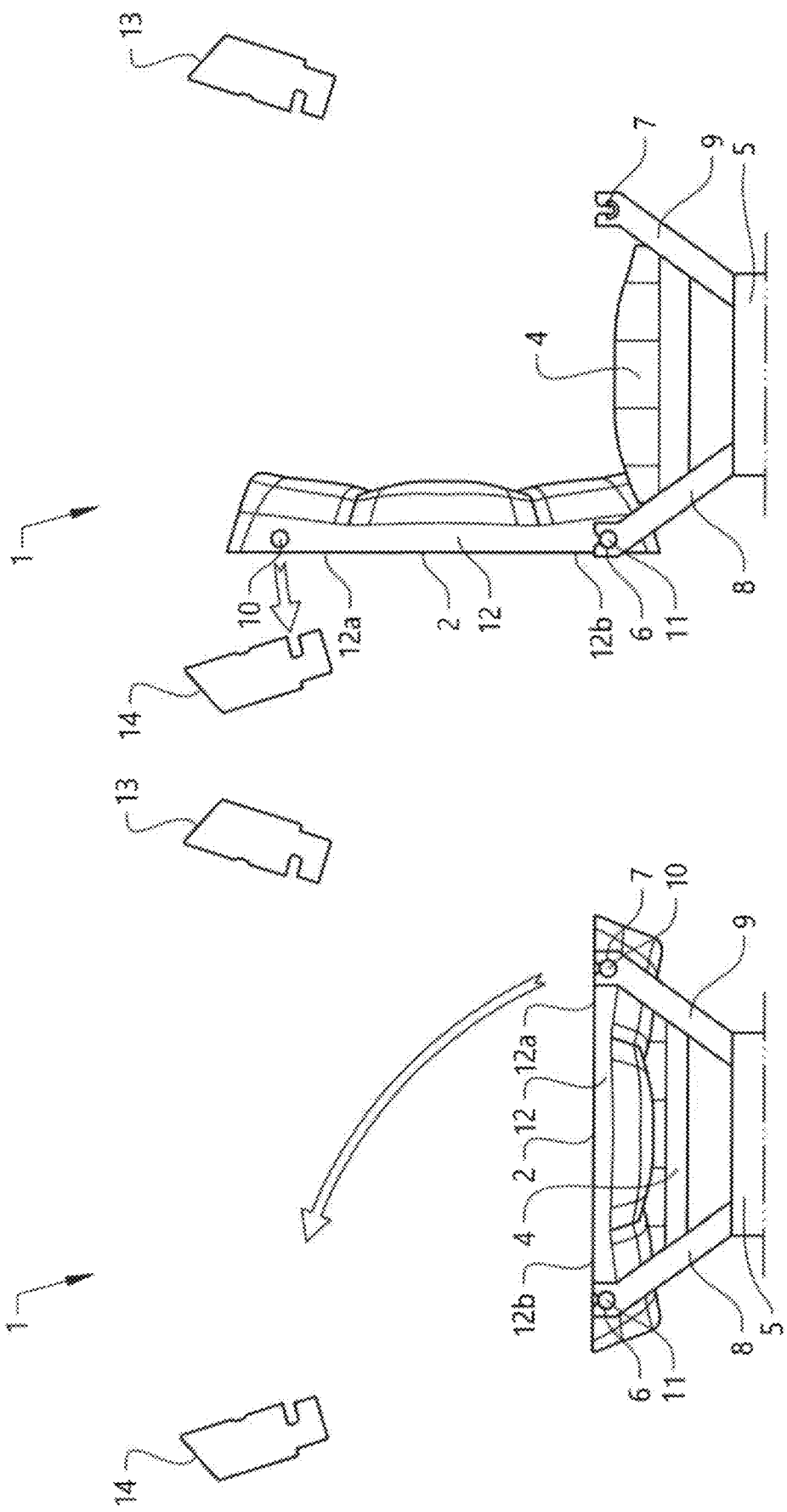

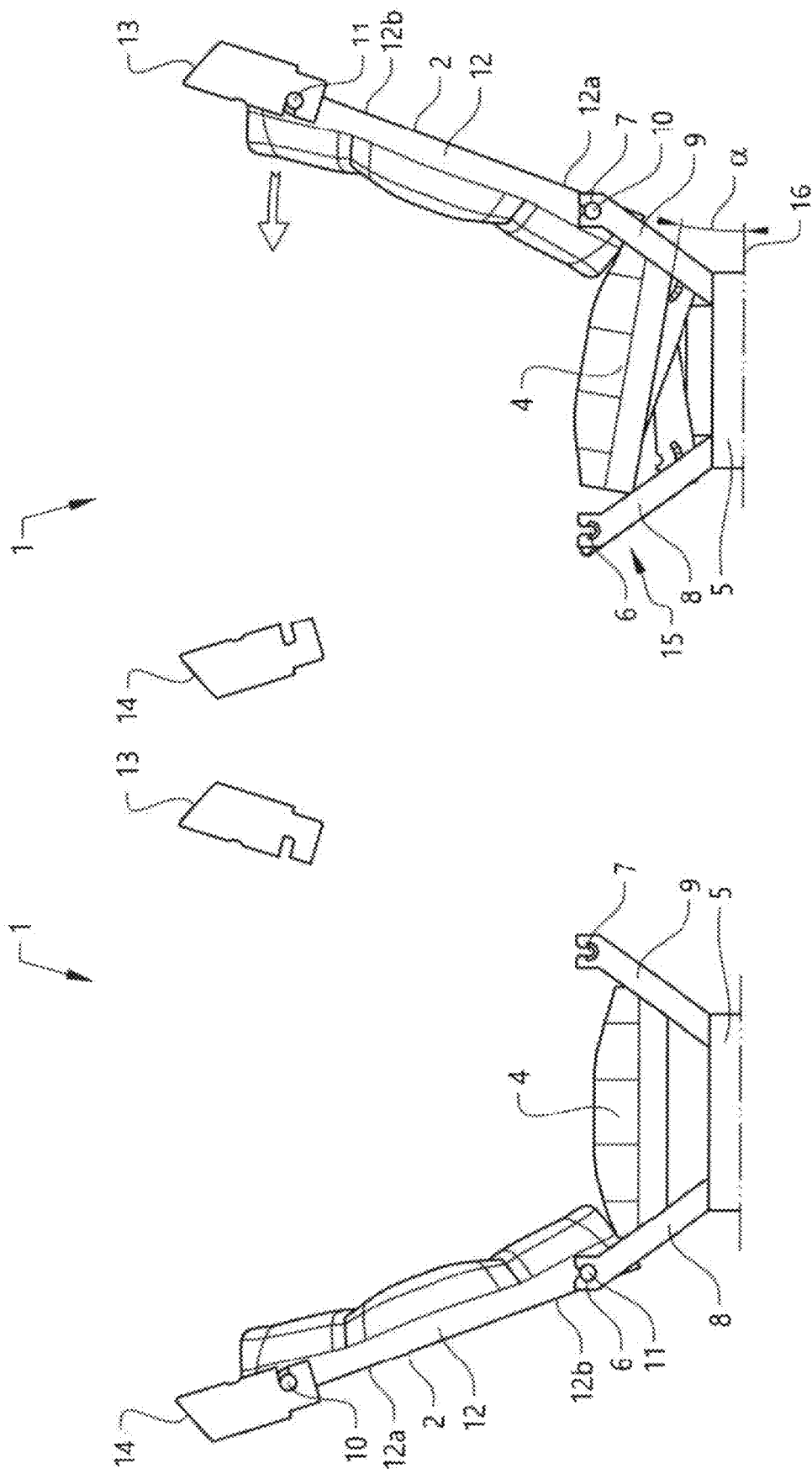

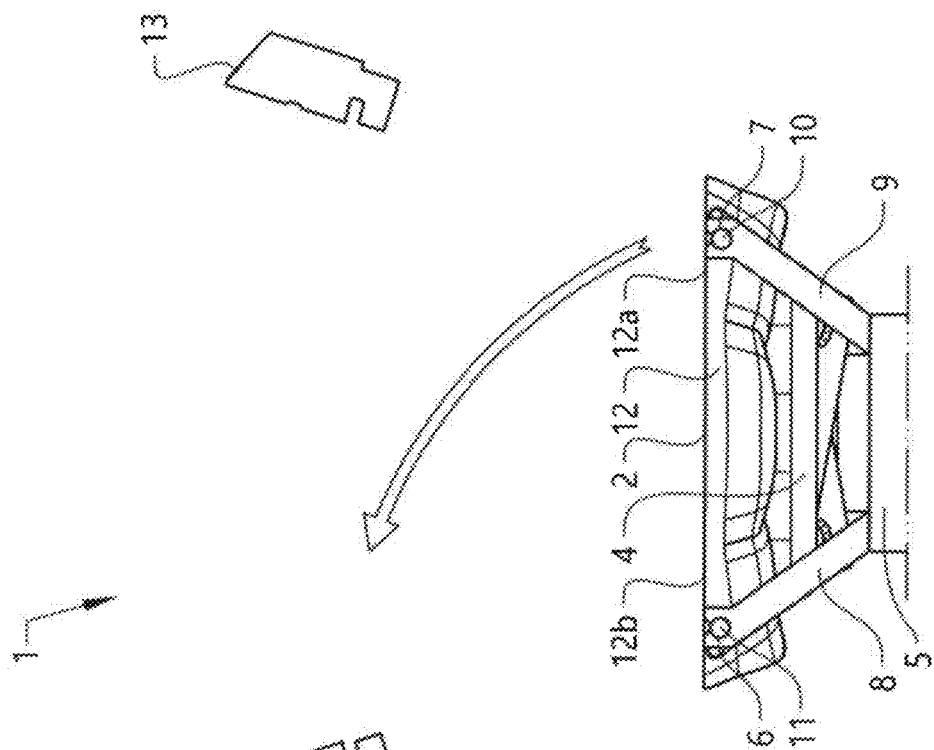
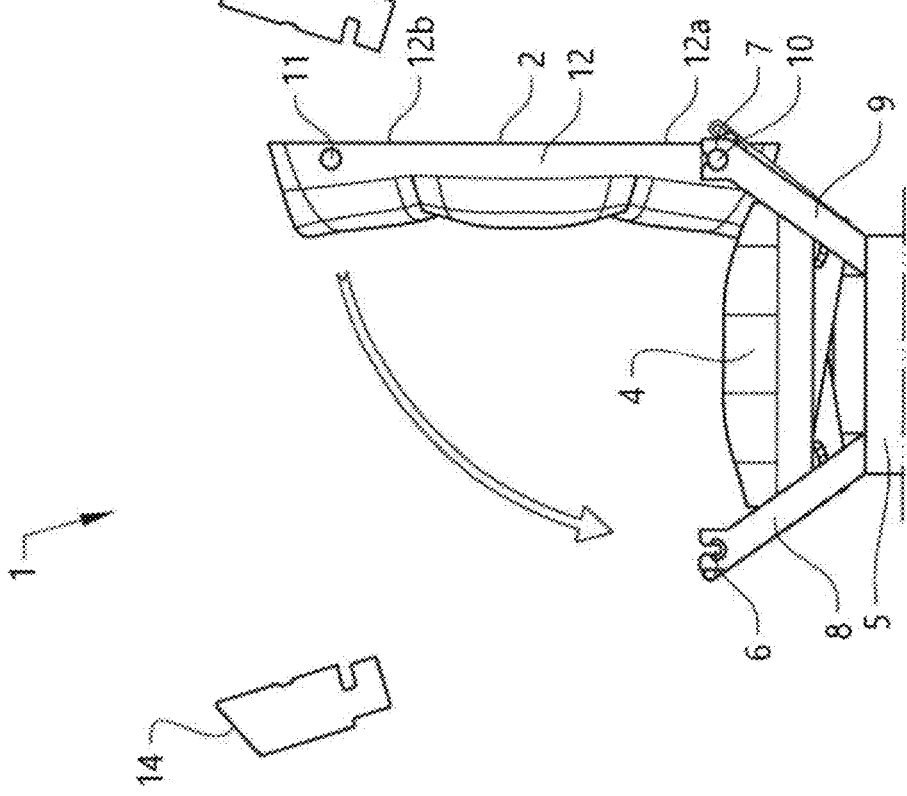
Fig. 2B
Fig. 2C

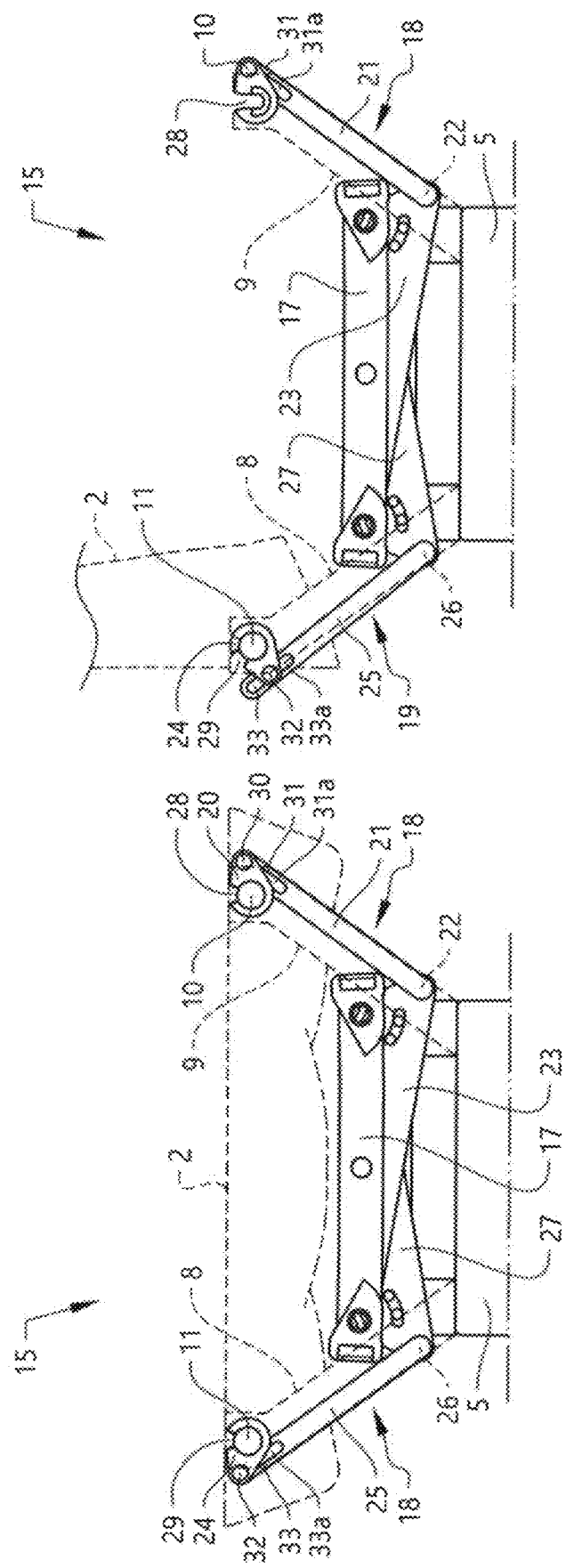

VEHICLE SEAT ADJUSTABLE BETWEEN A FORWARD FACING SETUP AND A REARWARD FACING SETUP

RELATED APPLICATION DATA

This application is a continuation of International Patent Application No. PCT/CN2020/101310, filed Jul. 10, 2020, which claims the benefit of European Patent Application No. 19191574.3, filed Aug. 13, 2019, the disclosures of which are incorporated herein by reference in their entireties.

TECHNICAL FIELD

The invention relates to a vehicle seat arranged to be adjusted between a forward facing setup and a rearward facing setup. The vehicle seat comprises a seat back and a seat cushion arrangement. The seat cushion arrangement comprises a seat cushion arranged to be attached to a seat structure arranged in a vehicle, a front pivoting notch and a rear pivoting notch. The seat back and seat cushion each has a symmetric shape. The seat back comprises a first and a second seat back connection arranged on a seat back side at a respective first and second end of the seat back. The first seat back connection is arranged to pivotably and releasably engage with the rear pivoting notch of the seat cushion arrangement when the vehicle seat is in the forward facing setup and the second seat back connection is arranged to pivotably and releasably engage with the front pivoting notch of the seat cushion arrangement when the vehicle seat is in the rearward facing setup. The seat back is arranged to change from the forward facing setup to the rearward facing setup by folding the seat back by pivoting the first seat back connection in the rear pivoting notch until the second seat back connection engages with the front pivoting notch and thereafter folding the seat back by pivoting the second seat back connection in the front pivoting notch.

BACKGROUND

Large vehicles such as sport utility vehicles, minivans or multi-purpose vehicles may have a third row of seats as compared to smaller vehicles that normally have two rows of seats. In some instances, it is useful to be able to adjust the second and/or the third row from a forward facing setup to a backward facing setup (and vice versa).

Many solutions on the market usually requires the user to disassemble the seat from the floor, bring it out of the vehicle, rotate it manually and then assemble it to the seat structure in the vehicle floor again. This makes changing the seat setup difficult and time consuming and may require the use of tools.

U.S. Pat. No. 645,609 discloses a vehicle seat comprising a seat back and a seat cushion, where the seat back is symmetric and arranged to pivotably and releasably engage with pivoting notches on the seat cushion. The seat back is changed from a forward looking position to a rearward looking position by pivoting the seat back on the pivoting notches. Even though U.S. Pat. No. 645,609 discloses a way to change the seat facing setup inside the vehicle, disadvantages still exist.

SUMMARY

An objective of the disclosure is to provide an improved vehicle seat. The objective is achieved by a vehicle seat arranged to be adjusted between a forward facing setup and a rearward facing setup. The vehicle seat comprises a seat back and a seat cushion arrangement. The seat cushion arrangement comprises a seat cushion arranged to be attached to a seat structure arranged in a vehicle, a front pivoting notch and a rear pivoting notch. The seat back and seat cushion each has a symmetric shape. The seat back comprises a first and a second seat back connection arranged on a seat back side at a respective first and second end of the seat back. The first seat back connection is arranged to pivotably and releasably engage with the rear pivoting notch of the seat cushion arrangement when the vehicle seat is in the forward facing setup. The second seat back connection is arranged to pivotably and releasably engage with the front pivoting notch of the seat cushion arrangement when the vehicle seat is in the rearward facing setup. The seat back is arranged to change from the forward facing setup to the rearward facing setup by folding the seat back by pivoting the first seat back connection in the rear pivoting notch until the second seat back connection engages with the front pivoting notch and thereafter folding the seat back by pivoting the second seat back connection in the front pivoting notch. The second seat back connection is arranged to releasably engage with a first latch attached to the vehicle body when the vehicle seat is in the forward facing setup, and the first seat back connection is arranged to releasably engage with a second latch attached to the vehicle body when the vehicle seat is in the rearward facing setup.

One advantage with the vehicle seat according to the disclosure is that it provides an easy way to change the facing setup of the vehicle seat. With the latch, the seat back is held in place until adjustment of the facing setup of the vehicle seat is desired. Additional safety is provided as the seat back is attached to a latch. The latch provides an additional attachment to the vehicle body and thereby improves the crash resistance of the vehicle seat. A vehicle seat without the attachment to the latch would risk collapsing in a crash, seriously injuring the user and possibly also other people in the vehicle.

The seat cushion arrangement may further comprise a seat cushion tilting mechanism arranged underneath the seat cushion arranged to connect the seat cushion to the seat back, such that the seat cushion changes its seat cushion angle when the seat back is folded to an upright position. The seat cushion angle of the seat cushion changes to adjust the seat cushion between the forward facing setup and the rearward facing setup.

The seat cushion arrangement provides a way to change the seat cushion angle of the seat cushion depending on the facing setup of the vehicle seat. An angled seat as opposed to a horizontal seat as in U.S. Pat. No. 645,609 improves the comfort of the seat as well as the safety of the seat.

The seat cushion tilting mechanism may comprise a seat cushion base connected to a rear tilting arrangement arranged to engage with the first connection of the seat back and to a front tilting arrangement arranged to engage with the second connection of the seat back.

The rear tilting arrangement may comprise a rear tilting engagement member movably attached to a rear tilting lever arrangement rotatably connected to the seat structure and comprises a transverse rear tilting lever connection attached to a rear tilting frame rotatably attached to the seat cushion base. The front tilting arrangement may comprise a front tilting engagement member movably attached to a front tilting lever arrangement rotatably connected to the seat structure and comprises a transverse front tilting lever connection attached to a front tilting frame rotatably attached to the seat cushion base.

The seat cushion tilting mechanism with the rear tilting engagement member and front tilting engagement member ensures that the seat cushion will be in its proper position when the vehicle seat has changed its facing setup.

The vehicle seat may comprise a bucket or captain's seat.

The vehicle seat according to the disclosure can be made to fit various types of vehicle seats. Two examples of vehicle seats are bucket seats and captain's seats that each comprises an outer armrest and an inner armrest. These kinds of vehicle seats are useful if only one person would like to change the facing setup of his or her seat.

The vehicle seat may comprise a bench seat.

As an alternative to bucket or captain's seats, the vehicle seat may be a bench seat. In this case, the entire bench seat, or a part of the bench seat if it is a split bench, is arranged to be pivotable in order to change its facing setup. Being able to use a bench seat in the seat arrangement makes it possible to adapt a vehicle with different types of seats depending on the customer's desired setup of the vehicle.

The vehicle seat may be arranged in the first row of a vehicle. The vehicle seat may be arranged in the second row of a vehicle. The vehicle seat may be arranged in the third row of a vehicle.

The vehicle seat of the vehicle seat arrangement can be arranged at any location in a vehicle. Depending on which row the vehicle seat is installed, constraints on which of the two variations described above that can be used may exist. It is also conceivable that the vehicle seat arrangement can be used in even larger vehicles, such as buses, airplanes, helicopters, trains, ships, boats etc.

The invention also relates to a vehicle comprising a vehicle seat arrangement according to the above description.

BRIEF DESCRIPTION OF THE DRAWINGS

FIGS. 1A-1E schematically shows a vehicle seat according to a first embodiment of the disclosure, FIG. 2A-2E schematically shows a vehicle seat according to a second embodiment of the disclosure, FIGS. 3A-3E schematically show a close-up of the seat cushion tilting mechanism when the vehicle seat is adjusted between a forward facing setup and a rearward facing setup.

DETAILED DESCRIPTION

Figures 2D, 2E:
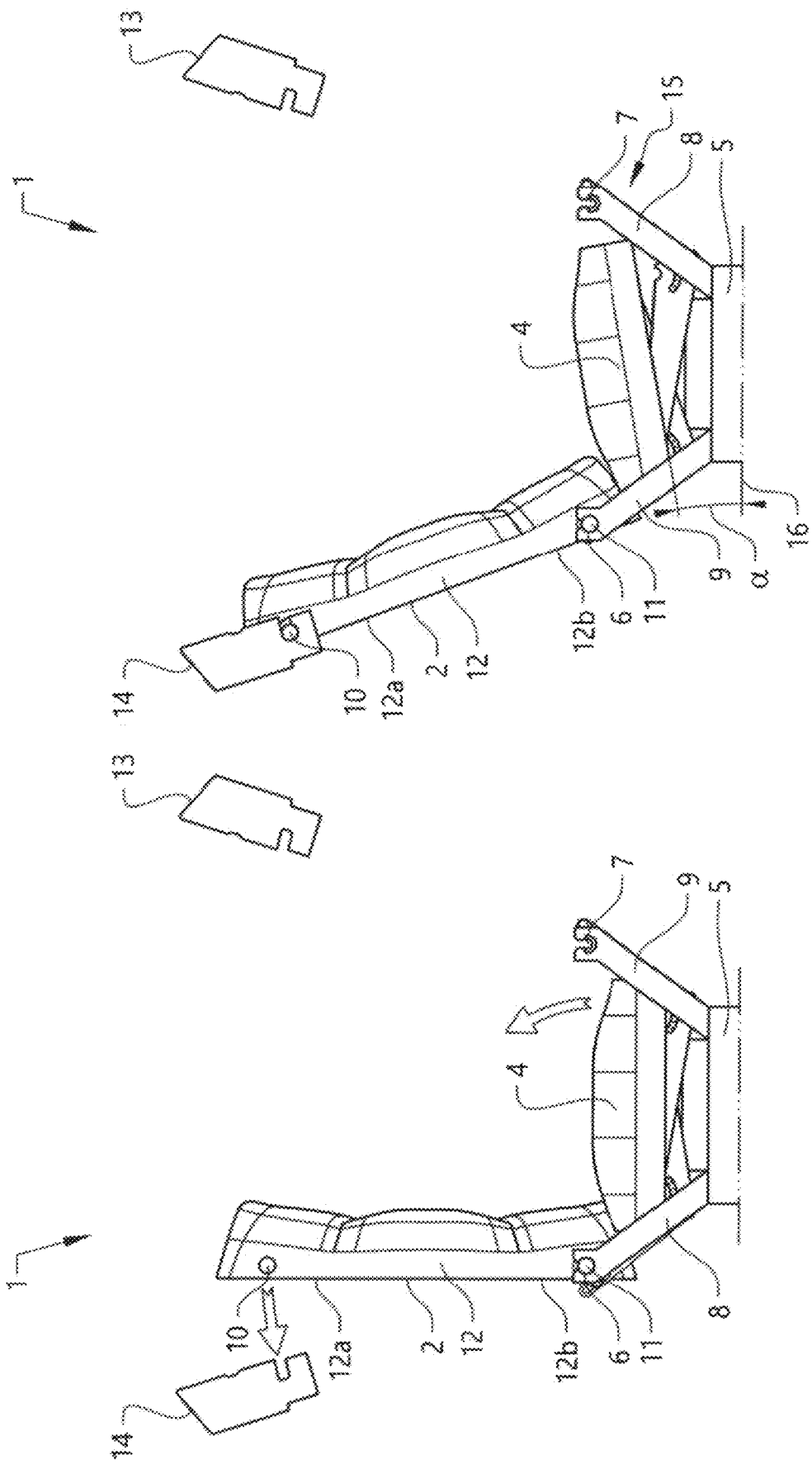

FIGS. 1A-1E schematically shows a vehicle seat 1 according to a first embodiment of the disclosure.

FIG. 1A shows a vehicle seat 1 arranged to be adjusted between a forward facing setup and a rearward facing setup. The vehicle seat 1 comprises a seat back 2 and a seat cushion arrangement 3. The seat cushion arrangement 3 comprises a seat cushion 4 arranged to be attached to a seat structure 5 arranged in a vehicle, a front pivoting notch 6 and a rear pivoting notch 7. The front pivoting notch 6 is arranged in a front seat structure member 8 and the rear pivoting notch 7 is arranged in a rear seat structure member 9. The seat back 2 and the seat cushion 4 each has a symmetric shape. The seat back 2 comprises a first seat back connection 10 and a second seat back connection 11 arranged on a seat back side 12 at a respective first end 12a and second end 12b of the seat back 2. The first seat back connection 10 and the second seat back connection 11 may be arranged on either seat back side 12 at a respective first end 12a and second end 12b of the seat back 2. The first seat back connection 10 and the second seat back connection 11 may alternatively be arranged on both seat back sides 12 of the seat back 2.

In FIG. 1A, the first seat back connection 10 is pivotably and releasably engaged with the rear pivoting notch 7 of the seat cushion arrangement 3 and the vehicle seat 1 is in a forward facing setup. The front of the vehicle is thus to the left in the figure. The second seat back connection 11 is releasably engaged with a first latch 13 attached to a vehicle body (not shown). A second latch 14 attached to the vehicle body is attached oppositely to the first latch 13 in the forward facing direction. The front pivoting notch 6 of the seat cushion arrangement 3 is also seen in FIG. 1A.

As a first step, the second seat back connection 11 will be released from the first latch 13 and the seat back 2 is ready to be folded by pivoting the first seat back connection 10 in the rear pivoting notch 7 by moving the second end 12b of the seat back 2 forward and downward as indicated by the arrow.

In FIG. 1B, the seat back 2 has begun to be folded by pivoting the first seat back connection 10 in the rear pivoting notch 7 to a vertical position. As a second step, the seat back 2 will be laid horizontally over the seat cushion 4 where the second seat back connection 11 will pivotably and releasably engage with the front pivoting notch 6 as indicated by the arrow.

In FIG. 1C, the seat back 2 lie horizontally over the seat cushion 4 and both the first seat back connection 10 and the second seat back connection 11 are pivotably and releasably engaged to the rear pivoting notch 7 and front pivoting notch 6 respectively. As a third step, the seat back 2 is ready to be folded towards the rearward facing setup by moving the first end 12a of the seat back 2 upward and forward as indicated by the arrow.

In FIG. 1D, the seat back 2 is folded upward to a vertical position and, as a fourth step, the first seat back connection 10 is prepared to be releasably attached to the second latch 14 as indicated by the arrow.

In FIG. 1E, the first seat back connection 10 has attached to the second latch 14 and the vehicle seat 1 has been adjusted to the rearward facing setup.

FIG. 2A-2E schematically shows a vehicle seat 1 according to a second embodiment of the disclosure. The adjustment between from the forward facing setup to the rearward facing setup is the same as described in FIGS. 1A-1E. The differences between the first and the second embodiment will be described.

In FIG. 2A, the seat cushion arrangement 3 of the vehicle seat 1 further comprises a seat cushion tilting mechanism 15 arranged underneath the seat cushion 4. The seat cushion tilting mechanism 15 is arranged to connect the seat cushion 4 to the seat back 2, such that the seat cushion 4 changes its seat cushion angle $\alpha$ when the seat back 2 is adjusted to the respective forward facing state or rearward facing state. The seat cushion angle $\alpha$ of the seat cushion 4 changes to adjust the seat cushion 4 between the forward facing setup and the rearward facing setup. The seat cushion tilting mechanism 15 will be described in detail below. The seat cushion angle $\alpha$ can be the same in both the forward facing setup and the rearward facing setup or be different.

In FIG. 2A, the seat cushion 4 is arranged with a seat cushion angle $\alpha$ relative a horizontal plane 16 as measured from an underside of the seat cushion 4. This increases the seat comfort for a user of the vehicle seat 1. Similar to FIG. 1A, the second seat back connection 11 is ready to be released from the first latch 13 and the seat back 2 is ready to be folded by pivoting the first seat back connection 10 in the rear pivoting notch 7 by moving the second end 12b of the seat back 2 forward and downward as indicated by the arrow.

In FIG. 2B, the seat cushion tilting mechanism 15, connecting the seat cushion 4 and the seat back 2, has adjusted the seat cushion 4 to a horizontal position as the seat back 2 has started to fold forwards and downwards to a vertical position. As in FIG. 1B, the seat back 2 is ready to be laid horizontally over the seat cushion 4 where the second seat back connection 11 will pivotably and releasably engage with the front pivoting notch 6.

In FIG. 2C, the seat back 2 lie horizontally over the seat cushion 4 and both the first seat back connection 10 and the second seat back connection 11 are pivotably and releasably engaged to the rear pivoting notch 7 and front pivoting notch 6 respectively. Similar to FIG. 1C, the seat back 2 is ready to be folded towards the rearward facing setup by moving the first end 12a of the seat back 2 upward and forward.

In FIG. 2D, the seat back 2 is folded upward and forward to a vertical position and, as in FIG. 1D, the second seat back connection 11 is prepared to be releasably attached to the second latch 14 as indicated by the arrow.

In FIG. 2E, the first seat back connection 10 has attached to the second latch 14 and the vehicle seat 1 has been adjusted to the rearward facing setup. The seat cushion tilting mechanism 15, connecting the seat cushion 4 and the seat back 2, has adjusted the seat cushion 4 to its seat cushion angle α upon the movement of the seat back 2 such that the first seat back connection 10 attaches to the second latch 14.

FIGS. 3A-3E schematically show a close-up of the seat cushion tilting mechanism 15 when the vehicle seat 1 is adjusted between a forward facing setup and a rearward facing setup according to FIGS. 2A-2E.

The seat cushion tilting mechanism 15 comprises a seat cushion base 17 connected to a rear tilting arrangement 18 arranged to engage with the first seat back connection 10 of the seat back 2. The seat cushion tilting mechanism 15 is also connected to a front tilting arrangement 19 arranged to engage with the second seat back connection 11 of the seat back 2. The front pivoting notch 6 of the front seat structure member 8 and the rear pivoting notch 7 of the rear seat structure member 9 are shown in dashed lines.

The rear tilting arrangement 18 comprises a rear tilting engagement member 20 movably attached to a rear tilting lever arrangement 21 rotatably connected to the seat structure 5 and comprising a transverse rear tilting lever connection 22 attached to a rear tilting frame 23 rotatably attached to the seat cushion base 17. The front tilting arrangement 19 comprises a front tilting engagement member 24 movably attached to a front tilting lever arrangement 25 rotatably connected to the seat structure 5 and comprising a transverse front tilting lever connection 26 attached to a front tilting frame 27 rotatably attached to the seat cushion base 17.

The rear tilting engagement member 20 comprises a rear receiving opening 28 arranged in line with the rear pivoting notch 7 such that when the first seat back connection 10 engages with the rear pivoting notch 7, the first seat back connection 10 also engages with the rear tilting engagement member 20. The front tilting engagement member 24 comprises a front receiving opening 29 arranged in line with the front pivoting notch 6 such that when the second seat back connection 11 engages with the front pivoting notch 6, the second seat back connection 11 also engages with the front tilting engagement member 24. The first seat back connection 10 and the second seat back connection 11 are arranged to rotate the rear tilting engagement member 20 and front tilting engagement member 24 when the seat back 2 pivots in the rear pivoting notch 7 and the front pivoting notch 6 respectively.

Figures 3A, 3B:
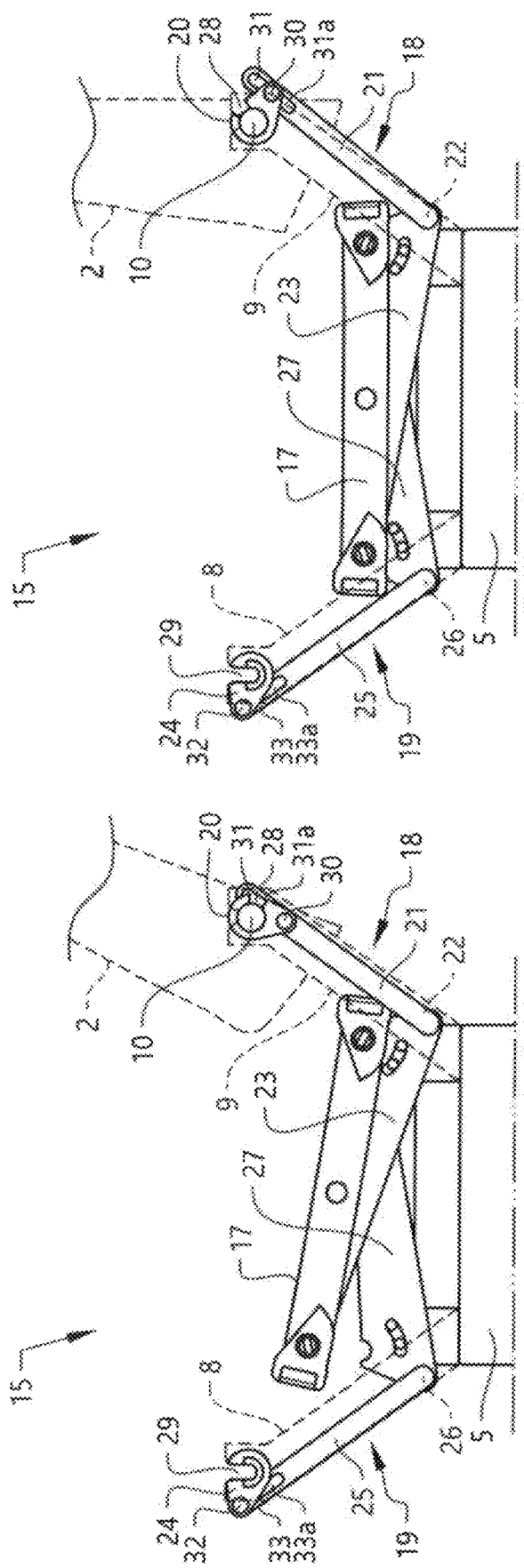

In FIG. 3A, the first seat back connection 10 of the seat back 2 is shown to be in place in the rear receiving opening 28 and in the rear pivoting notch 7. The rear tilting engagement member 20 comprises a rear tilting engagement pin 30 arranged to run in a rear tilting lever arrangement slot 31. In FIG. 3A, the vehicle seat (not shown) is in its forward facing setup. The rear tilting engagement member 20 is in this setup arranged to press on the rear tilting lever arrangement 21 by means of pressing downward and forward on a lower end 31a of the rear tilting lever arrangement slot 31. The rear tilting lever arrangement 21, being rotatably connected to the rear tilting frame 23 which in turn is rotatably attached to the seat cushion base 17, ensure that the seat cushion base 17 is arranged with the proper seat cushion angle α for increased comfort.

In FIG. 3B, the seat back 2 has been moved to a vertical position. The first seat back connection 10 of the seat back 2 rotating with the movement of the seat back 2, rotates the rear tilting engagement member 20. Thereby the rear tilting engagement pin 30 moves away from the lower end 31a of the rear tilting lever arrangement slot 31. This leads to that pressure is relieved from the rear tilting lever arrangement slot 31 and thereby the rear tilting lever arrangement 21. This leads to that the rear tilting frame 23 lowers the seat cushion base 17 to a horizontal position.

In FIG. 3C, the seat back 2 has been lain horizontally over the seat cushion 4 and both the first seat back connection 10 and the second seat back connection 11 are pivotably and releasably engaged to the rear pivoting notch 7 and front pivoting notch 6 respectively.

In FIG. 3D, the seat back 2 is folded upward and forward to a vertical position. The front tilting engagement member 24 comprises a front tilting engagement pin 32 arranged to run in a front tilting lever arrangement slot 33. The second seat back connection 11 of the seat back 2 rotating with the movement of the seat back 2, rotates the front tilting engagement member 24. Thereby, the front tilting engagement pin 32 moves towards a lower end 33a of the front tilting lever arrangement slot 33.

Figure 3E:
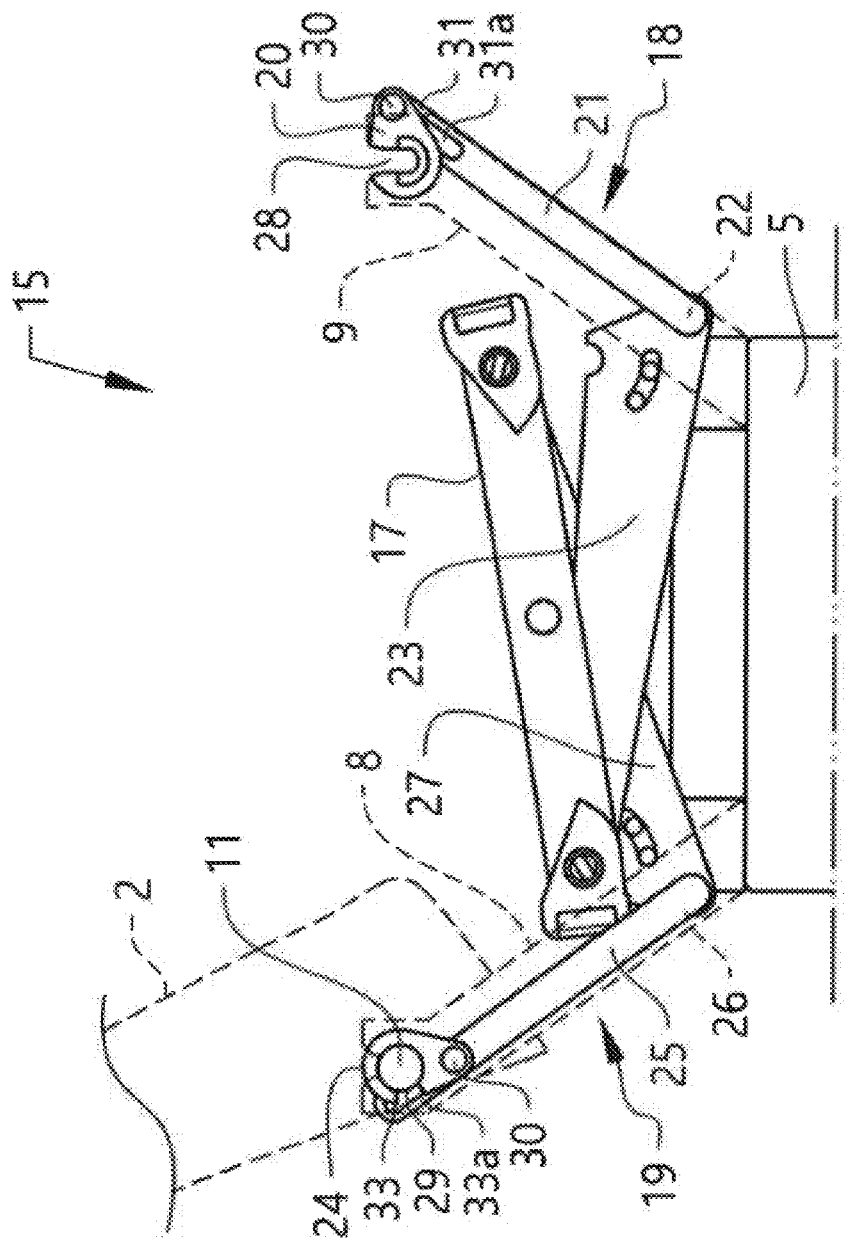

In FIG. 3E, the second seat back connection 11 of the seat back 2 has further rotated the front tilting engagement member 24. The front tilting engagement member pin 32 presses on the front tilting lever arrangement 25 by means of pressing downward and forward on the lower end 33a of the front tilting lever arrangement slot 33. The front tilting lever arrangement 25, being rotatably connected to the front tilting frame 27 which in turn is rotatably attached to the seat cushion base 17, ensure that the seat cushion base 17 is arranged with the proper seat cushion angle α for increased comfort. The vehicle seat is now in the rearward facing setup.

Although the disclosure has been illustrated and described in detail in the drawings and foregoing description, such illustration and description are to be considered illustrative or exemplary and the disclosure is not limited to the disclosed embodiments.

What is claimed is:

1. A vehicle seat arranged to be adjusted between a forward facing setup and a rearward facing setup, the vehicle seat comprising a seat back and a seat cushion arrangement, the seat cushion arrangement comprising a seat cushion arranged to be attached to a seat structure arranged in a vehicle, a front pivoting notch and a rear pivoting notch, wherein the seat back and seat cushion each has a symmetric shape, wherein the seat back comprises a first seat back connection and a second seat back connection arranged on a seat back side at a respective first end and second end of the seat back, the first seat back connection being arranged to pivotably and releasably engage with the rear pivoting notch of the seat cushion arrangement when the vehicle seat is in the forward facing setup and the second seat back connection being arranged to pivotably and releasably engage with the front pivoting notch of the seat cushion arrangement when the vehicle seat is in the rearward facing setup, wherein the seat back is arranged to change from the forward facing setup to the rearward facing setup by folding the seat back by pivoting the first seat back connection in the rear pivoting notch until the second seat back connection engages with the front pivoting notch and thereafter folding the seat back by pivoting the second seat back connection in the front pivoting notch, wherein the second seat back connection is arranged to releasably engage with a first latch attached to the vehicle body when the vehicle seat is in the forward facing setup, and the first seat back connection is arranged to releasably engage with a second latch attached to the vehicle body when the vehicle seat is in the rearward facing setup.

2. The vehicle seat according to claim 1, wherein the seat cushion arrangement further comprises a seat cushion tilting mechanism arranged underneath the seat cushion arranged to connect the seat cushion to the seat back, such that the seat cushion changes its seat cushion angle when the seat back is folded to an upright position, wherein the seat cushion angle of the seat cushion changes to adjust the seat cushion between the forward facing setup and the rearward facing setup.

3. The vehicle seat according to claim 2, wherein the seat cushion tilting mechanism comprises a seat cushion base connected to a rear tilting arrangement arranged to engage with the first connection of the seat back and to a front tilting arrangement arranged to engage with the second connection of the seat back.

4. The vehicle seat according to claim 3, wherein the rear tilting arrangement comprises a rear tilting engagement member movably attached to a rear tilting lever arrangement rotatably connected to the seat structure and comprising a transverse rear tilting lever connection attached to a rear tilting frame rotatably attached to the seat cushion base, and wherein the front tilting arrangement comprises a front tilting engagement member movably attached to a front tilting lever arrangement rotatably connected to the seat structure and comprising a transverse front tilting lever connection attached to a front tilting frame rotatably attached to the seat cushion base.

5. The vehicle seat according to claim 1, wherein the vehicle seat comprises a bucket or captain's seat.

6. The vehicle seat according to claim 1, wherein the vehicle seat comprises a bench seat.

7. The vehicle seat according to claim 1, wherein the vehicle seat is arranged in the first row of a vehicle.

8. The vehicle seat according to claim 1, wherein the vehicle seat is arranged in the second row of a vehicle.

9. The vehicle seat according to claim 1, wherein the vehicle seat is arranged in the third row of a vehicle.

10. A vehicle comprising a vehicle seat according to claim 1.

* * * * *